United States Patent
Dalby et al.

(10) Patent No.: US 6,977,934 B1
(45) Date of Patent: Dec. 20, 2005

(54) DATA TRANSPORT

(75) Inventors: David Dalby, Suffolk (GB); John Martin O'Donnell, Suffolk (GB)

(73) Assignee: British Telecommunications, London (GB)

( * ) Notice: Subject to any disclaimer, the term of this patent is extended or adjusted under 35 U.S.C. 154(b) by 0 days.

(21) Appl. No.: 09/806,576

(22) PCT Filed: Oct. 15, 1999

(86) PCT No.: PCT/GB99/03416

§ 371 (c)(1),
(2), (4) Date: Apr. 2, 2001

(87) PCT Pub. No.: WO00/27087

PCT Pub. Date: May 11, 2000

(30) Foreign Application Priority Data

Oct. 30, 1998  (EP) ................................. 98308894

(51) Int. Cl.[7] .......................... H04L 12/56; G06F 15/16
(52) U.S. Cl. ....................... 370/394; 370/485; 709/231
(58) Field of Search .............................. 370/394, 485, 370/486, 487; 709/231

(56) References Cited

U.S. PATENT DOCUMENTS

| | | | | |
|---|---|---|---|---|
| 5,260,783 | A | * | 11/1993 | Dixit ..................... 375/240.13 |
| 6,148,005 | A | * | 11/2000 | Paul et al. .................. 370/469 |
| 6,275,471 | B1 | * | 8/2001 | Bushmitch et al. ......... 370/248 |
| 6,738,379 | B1 | * | 5/2004 | Balazinski et al. ......... 370/394 |

FOREIGN PATENT DOCUMENTS

| | | |
|---|---|---|
| EP | 0725506 A2 | 8/1996 |
| FR | 2736486 | 6/1995 |

OTHER PUBLICATIONS

Huang et al: "MHTP—A Multimedia High-Speed Transport Protocol' Communication for Global Users", Orlando, Dec. 6-9, 1992, vol. 3, Dec. 6, 1992, pp. 1364-1368, XP000390432, Institute of Electrical and Electronics Engineers.

Delgrossil et al., "HEITP—A Transport Protocol For St-11' Communication for Global Users", Orlando, Dec. 6-9, 1992, vol. 3, pp. 1369-1373, XP000390433, Institute of Electrical and Electronics Engineers.

Wilson, et al., "An Efficient Loss Priority Scheme For MPEG-2 Variable Bit Rate Video for ATM Networks", IEEE 1996, Essex University.

International Preliminary Examination Report.

RFC 1693; "An Extension to TCP : Partial Order Service", Nov. 1994.

* cited by examiner

Primary Examiner—Min Jung
(74) Attorney, Agent, or Firm—Nixon & Vanderhye P.C.

(57) ABSTRACT

A data streaming apparatus broadcasts data, encoded by a layered encoding algorithm, each layer of encoded data frames being conveyed within separate respective streams of data packets of a predetermined packet structure. A packet numbering facility assigns to each data packet a data sequence number indicating the correct order for subsequent decoding of encoded data conveyed by that packet. Corresponding client apparatus receives data packets having such data sequence numbers assigned to them, including a packet ordering facility to place out-of-sequence packets into the correct order for output to a decoder.

17 Claims, 5 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      defined by profile       |           length              |
+-+-+-+-+-+-+-+-+-+-+-+-+-+-+-+-+-+-+-+-+-+-+-+-+-+-+-+-+-+-+-+-+
|                        Header extension                       |
|                             ....                              |
```

FIGURE 5b

DATA TRANSPORT

BACKGROUND

1. Field of the Invention

This invention relates to transport of data over communications networks and, in particular, to transport of data encoded by layered encoding algorithms.

2. Related Art

Networks based upon the Internet Protocol (IP) are being used increasingly to convey multi-media data transmissions, enabled by the use of compression algorithms to reduce data volumes to sufficiently low levels for transport over relatively low data rate network connections. However, problems remain to be overcome to achieve distribution of multi-media services, audiovisual services for example, to a large number of client terminals having a variety of different capabilities for receipt of such services. In particular, some clients may have access only to limited data rate network connections enabling receipt of only low-resolution and low picture rate video. Other users may be connected to relatively high bandwidth corporate LANs and demand higher quality reception. Known methods for providing different levels of service to different users include point-to-point services whereby a tailored version of a session is separately transmitted directly to each user at their network address, and simulcast techniques whereby a number of different data rate transmissions are broadcast and users may select and share that most suited to their needs. However, both point-to-point and simulcast techniques involve significant overlap and duplication of data between transmitted data streams and are clearly inefficient in their consumption of network capacity.

Layered encoding techniques, such as that implemented for example under the H.263 standard for video data compression, defined in "Video Coding for Low Bit Rate Communications", International Telecommunication Union (ITU)—T Recommendation H.263, January 1998, enable data representing different resolutions of video to be encoded as separate layers of data frames. At the lowest layer, layer O, a "lowest common denominator" encoding may be provided. Frames within layer O may provide a relatively low resolution representation of original images, not necessarily all the original images. Date frames in higher layers may add increasing levels of detail to representations by lower layer frames or may encode images omitted from the lower layers altogether. Each layer of encoded data frames may be broadcast separately by a server, each layer to a different multi-casting network address. It is intended that most user equipment may be able to receive the lowest layer O by accessing the appropriate multi-cast address for layer O. Users who so choose, or who have equipment capability to receive higher layers may access one or more of the corresponding network addresses to enjoy a higher quality of audiovisual service. In this way, disparate client needs may be satisfied by a single broadcast of each layer without unnecessary duplication of data.

Where multi-casting techniques are being used in relation to IP networks, a currently preferred protocol for transporting layers of encoded data frames is the User Datagram Protocol (UDP) as defined in "User Datagram Protocol", Internet RFC 768, J. Postel, August 1980, published on the Internet by the Internet Engineering Task Force (IETF). However, while UDP offers a more rapid procedure for sending messages with a minimum of protocol mechanism, in comparison with the Transmission Control Protocol (TCP) for example, this is achieved at the expense of guaranteed delivery. Data may be lost, perhaps to the extent that a one layer may be lost during conveyance over a network, or at least delayed with respect to other layers. Therefore, besides exercising a choice not to receive a higher layer of encoded data, there are involuntary reasons why a client apparatus may not receive all encoded data broadcast within a session. In both circumstances, problems may arise at a client apparatus in presenting received data to a decoder in the correct order for decoding.

In Jau-Shiung Huang et al.: "MHTP—A Multimedia High-Speed Transport Protocol", from GLOBECOM '92, Orlando—Communication for Global Users, Dec. 6–9, 1992, Volume 3, 6 December 1992, pages 1364–1368, XP000390432 IEEE, a protocol (MHTP) is described that enables packet sequence numbering and packet ordering to be managed within each of several sub-protocols as may each be used to convey a separate layer of multi-layer encoded data. However, MHTP does not solve the problem of how to present received packets, selected from across several sub-protocol layers, to a decoder in the correct order for decoding.

In "An Efficient Loss-Priority Scheme for MPEG-2 Variable Bit Rate Video for ATM Networks", Wilson, D. and Ghanbari, M., IEEE 1996, Essex University, a technique is described for generating an enhancement layer comprising only B-frames, though relying upon the correct relative timing of the base layer and the enhancement layer being maintained during transmission to ensure correct order of presentation of encoded frames to a decoder. Any variation in the expected delay between receipt of a first encoded frame from the base layer and the first from the enhancement layer, for example, would not be correctable prior to decoding.

In Internet RFC 1693: "An Extension to TCP: Partial Order Service", November 1994, an extension to TCP is described for transmitting a service profile during connection setup, defining an acceptable order of receipt for transmitted objects. The service profile includes a partial ordering matrix defining an acceptable order for numbered objects, enabling a receiver to order such objects to the extent defined in the profile, even though there may be loss or excessive delay in receiving certain objects. However, the overhead in defining and transmitting service profiles, prior to sending data, increases the complexity of transmitting and receiving apparatus and introduces additional delay.

BRIEF SUMMARY

According to a first aspect of the present invention, there is provided a data streaming apparatus, having:
  a data input for receiving data frames encoded by a layered encoding algorithm;
  packetising means to insert received data frames, so encoded, into one or more predetermined packet structures, the data frames associated with each encoded layer being inserted into a different respective sequence of packets;
  packet numbering means to assign a data sequence number to each packet generated by the packetising means, the data sequence number assigned to a packet being indicative of the order of receipt, at the data input, of encoded data inserted within the packet; and
  a network interface to transmit, in use, packets so created.

The present invention enables a sequence number to be assigned to each data packet, conveying encoded data, representative of the correct order for subsequent presentation of the encoded data to a decoder. Such a sequence number enables packets received at a client apparatus to be correctly ordered, even when the client apparatus does not receive all the transmitted layers of packets or when individual packets are lost. This is particularly important where differential encoding algorithms are used, such as that defined by the H.263 standard.

Differential encoders, such as those implementing H.263, generate layered data streams each having a highly variable data rate. The quantity of data required to encode each of a sequence of images differs according to the degree of variation between successive images. In general, the order of output of encoded frames by an encoder is the order required for input to a decoder. However, if during transport from encoder to decoder, one layer is lost or delayed significantly with respect to another, or if particular packets are lost, problems arise at the receiving equipment in presenting the received data packets to a decoder in the correct order for decoding. Therefore, while use of multi-layered encoding appears to solve the problem of accommodating different client needs, new problems arise in decoding multi-layered transmissions.

Preferably, a further sequence number may be assigned to each packet representing the order of transmission of the packet, under the control of a selected protocol, within a sequence of packets conveying a particular layer of encoded data frames. Such a sequence number may be used to improve packet ordering efficiency through identifying whether all packets expected within a particular packet sequence have been received and that the next packet for decode must lies in another packet sequence.

According to a second aspect of the present invention, there is provided a client apparatus having:
a network interface; packet receiving means to receive one or more sequences of data packets from the network interface, each data packet having a predetermined packet structure, each of said one or more sequences of data packets conveying a different respective layer of encoded data frames generated by a layered encoding algorithm and each data packet having assigned thereto a data sequence number indicative of the order of output of encoded data, conveyed by the data packet, from said layered encoding algorithm;
packet ordering means to place said received data packets into a decoding order using said data sequence numbers; and
output means to output packets so ordered.

According to a third aspect of the present invention, there is provided method of generating data packets to convey data frames encoded by a layered encoding algorithm for transmission over a communications network, each layer of encoded data frames being conveyed by a different respective sequence of data packets, including the steps of:
(1) receiving an encoded data frame;
(2) inserting data from said data frame into one or more data packets generated according to a predetermined packet structure;
(3) assigning, in respect of one of said one or more data packets, a data sequence number indicative of the order of receipt of encoded data inserted into said packet;
(4) writing said data sequence number at a predetermined position within said packet; and
(5) performing steps (3) and (4) in respect of each of said one or more data packets generated at step (2).

According to a fourth aspect of the present invention, there is provided method of ordering data packets received within one or more separately accessible sequences of data packets generated according to the method of claim 5, including the steps of:
(1) receiving one or more data packets on one or more of said one or more separately accessible sequences of data packets;
(2) selecting, from those data packets received at step (1), that data packet having the smallest assigned data sequence number amongst non-selected data packets;
(3) outputting said selected data packet;
(4) repeating steps (1) to (3).

BRIEF DESCRIPTION OF THE DRAWINGS

The invention will now be described in more detail, by way of example only, with reference to the accompanying drawings of which.

DETAILED DESCRIPTION OF EXEMPLARY EMBODIMENTS

Figure 1:
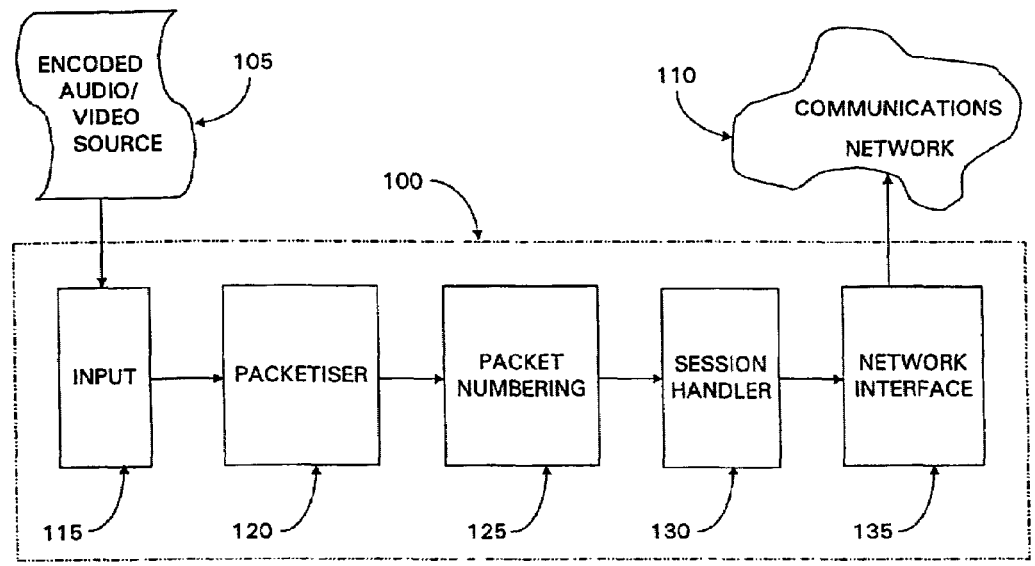
FIG. 1 shows a video streaming apparatus according to preferred embodiments of the present invention.

Preferred embodiments of the present invention will be now be described in the particular context of a video streaming apparatus, although the present invention may be applied to other forms of data broadcast and receiving apparatus, not necessarily in a client-server arrangement, involved in a single or multi-media session with data encoded by layered encoding techniques. Referring to FIG. 1, a video streaming apparatus 100 is shown, according to preferred embodiments of the present invention, for use in broadcasting multi-layer encoded audiovisual data from an encoded audio/video data source 105 to client systems over a communications network 110. The audio/video data source 105 may for example be a database of encoded video data for use in a "video-on-demand" system, or it may be a multi-layer encoded real-time audiovisual data stream to be transmitted as a live broadcast. The video streaming apparatus 100 accepts layers of encoded data from the source 105 at an input 115 before passing them to a packetiser 120. The packetiser 120 may implement a known algorithm for separately incorporating data from each layer of encoded data into a different respective stream of packets according to one or more predetermined packet structures. For example, one or more layers may be incorporated into packets having a structure defined for use with the Real-Time Transport Protocol (RTP), described by Internet Request for Comment (RFC) 1889, January 1996—"RTP: A Transport Protocol for Real-Time Applications" by H. Schulzrinne, S. Casner, R. Frederick and V. Jacobson, and published on the internet by the Internet Engineering Task Force (IETF). Once arranged according to their respective predetermined packet structure, the layers of packets are passed to a packet numbering module 125 to be numbered by a packet numbering method according to preferred embodiments of the present invention. The numbered packets are then passed to instances of a session handler 130, one instance of session handler per layer of packets. Each instance of session handler 130 may implement an appropriate protocol to control transfer of the respective layer of packets over the communications network 110, via a network interface 135, to one or more predetermined network addresses, multi-cast addresses for example. Protocols operating at lower levels in a protocol hierarchy of may be implemented by the network interface 135 as appropriate to the communications network 110. For example, at the level below RTP, the User Datagram Protocol (UDP) referenced above may be implemented by the network interface 135 to operate in conjunction with the Internet Protocol (IP).

Preferably, for simplicity, all layers of encoded data may be broadcast under the control, at the session level at least, of respective instances of the same protocol using the same packet structure. However, the scope of the present invention is intended to encompass those situations in which more than one type of protocol is employed to broadcast layers of encoded data received at the input 115.

Figure 2:
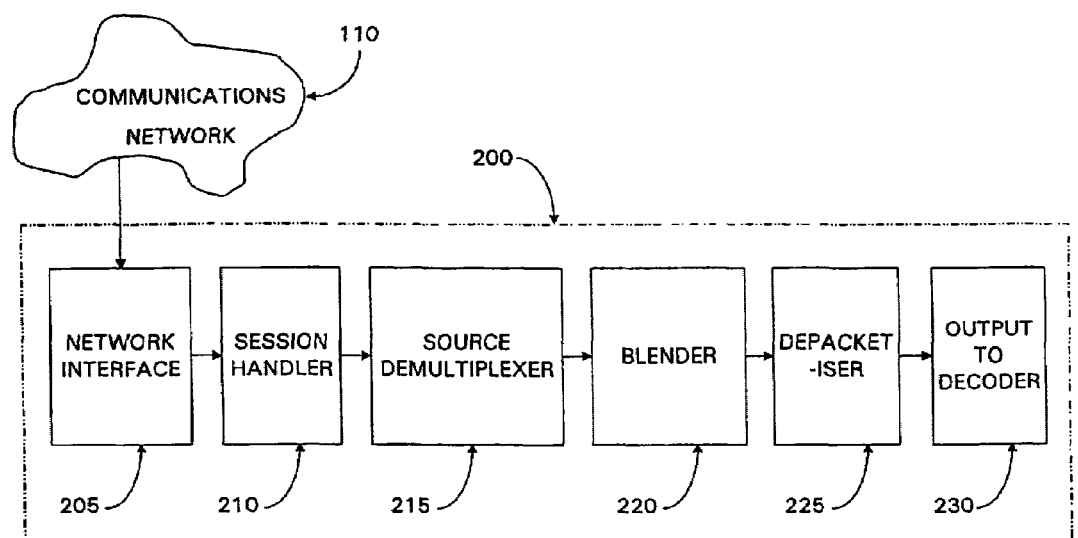
FIG. 2 shows a client apparatus arranged to receive signals transmitted by the apparatus of FIG. 1.

Referring to FIG. 2, a typical client apparatus 200 is shown for use in receiving, over the communications network 110, audio and/or video broadcasts by one or more sources having features in common with the video streaming apparatus 100 of FIG. 1. The client apparatus 200 may create instances of a session handler 210, each instance of session handler 210 "listening" for data received at a particular network address, one instance corresponding to each layer of packets received over the network via a network interface 205. The received layers of packets pass from their respective session handlers 210 into a source demultiplexer 215. In the event that multiple video streamers or other types of source are broadcasting on the same session, each source may preferably be separately identifiable by the source demultiplexer 215 using information inserted into packet headers by the respective source streamer. For each distinct source identified, the source demultiplexer may create one instance of a blender 220, collating all packets received via the session handlers 210 carrying the same source identifier, and passing the collated packets to the blender 220. The blender 220 may implement an algorithm, according to preferred embodiments of the present invention, for ordering packets received from the particular source using packet numbering information inserted by the packet numbering module 125 of the respective source, video streamer 100 for example. Having established the correct packet order, taking account of any missing or inaccessible layers and packets, the blender 220 may pass the ordered packets to a depacketiser 225 to recover the layers of encoded data from the respective predetermined packet structure used by the particular streaming source, by packetiser 120 in the case of a video streamer 100. The depacketiser 225 passes the recovered encoded data, now in the correct sequence for decoding, to an output 230. The ordered data output from the client apparatus 200 may be taken by an appropriate decoder and, following decoding, reproduced at a display and/or audio output apparatus as appropriate.

Figure 3:
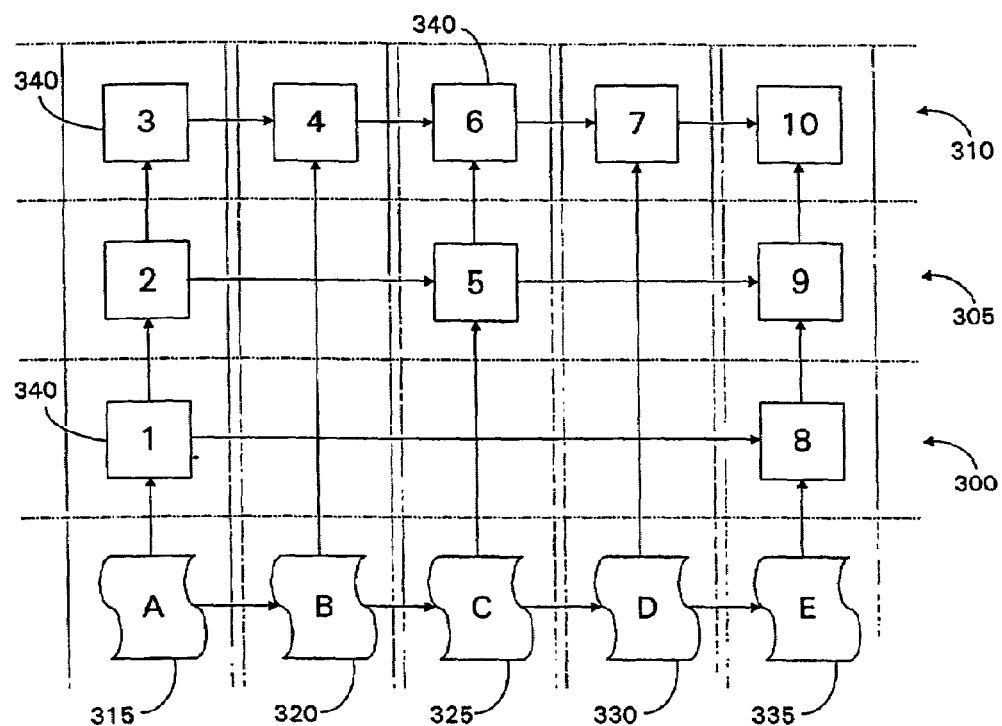
FIG. 3 shows a typical hierarchy of layered data frames, encoded from a small sequence of video images, for transmission by the apparatus of FIG. 1.

Referring to FIG. 3, a typical hierarchy of layered data frames is shown, encoded from a small sequence of video images, as might be presented to the input 115 of a video streamer 100. The encoded frames 340 are shown arranged as three layers, 300, 305 and 310 corresponding to a lowest layer, a middle layer and a top layer respectively. Further layers may be generated according to the particular encoding algorithm implemented by the source 105. Each encoded frame 340 of FIG. 3 is shown with a number in the range 1 to 10, indicating the order of output by the encoded data source 105 and hence the required order for subsequent presentation of the frames to a decoder. The frames 340 in FIG. 3 are shown grouped within five columns, each column of frames being encoded to represent a respective original image 315–335. For example, original image "A" 315, is shown encoded as a frame number "1" in the lowest layer 300, a frame "2" in middle layer 305 and a frame "3" in the top layer 310. Original image "B" 320 is represented only in the top layer 310 by a frame generated with number "4". The original image data 315–335 would not normally be presented to the input 115 of a video streaming apparatus 100.

The sequence of encoded frames 1–10 of FIG. 3 may, for example, be generated according to a video encoding algorithm such as H.263, referenced above. If the H.263 encoding technique is used to encode the images 315–335 of FIG. 3, each frame 340 in the lowest layer 300 may represent a low-resolution version of the respective original image and may be encoded using the basic H.263 algorithm at QCIF resolution as described in Section 4.1 of the referenced specification. Frames in layers 305 and 310 represent increasingly detailed enhancements to the low-resolution image represented by the respective frame in layer 300. Under H.263, the middle and top layers may be encoded according to the definition in Annex O, "Temporal, SNR and Spatial Scalability Modes", of the above-referenced H.263 specification.

Not all original images may be represented in the lower layers 300, 305. In the particular sequence shown in FIG. 3, only every fourth original image is represented in the lowest layer 300 and every second original image in the middle layer 305. Thus, a client apparatus able or choosing to decode only the lowest layer of frames will display a representation of the original sequence of images having a relatively low resolution and a relatively low image rate as compared with client apparatus able or choosing to decode both the lowest and middle layers. Apparatus able to receive and decode all three broadcast layers 300–310 will be able to display all the original images (315–335) at the highest resolution available. It is intended that a lower data rate network connection may be used to receive data frames at the lowest layer, making that layer accessible to most client equipment.

Figure 4:
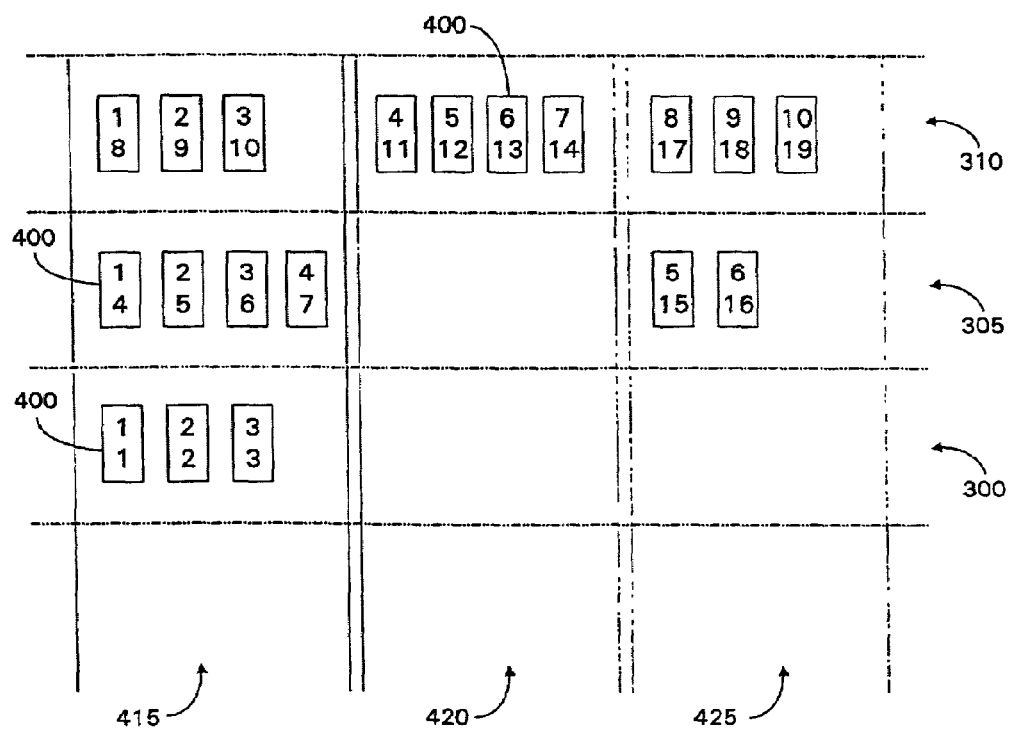
FIG. 4 shows the result of applying a packet numbering algorithm, according to preferred embodiments of the present invention, to packets generated to convey encoded data frames shown in FIG. 3.

Referring to FIG. 4, a diagram is provided to show a typical breakdown of those encoded frames 340, representing the first three original images 315, 320 and 325 of FIG. 3, across corresponding layered sequences of packets 400 by the packetiser 120. FIG. 4 also shows the result of applying a packet numbering scheme to those packets as may be implemented by the packet numbering module 125 according to preferred embodiments of the present invention. A typical packetiser 120 may operate to packetise each layer of encoded frames separately, generating, as in the present example, three separate streams of packets, one stream for each layer. As discussed in relation to FIG. 1 above, the packetiser 120 may be arranged to implement one or more packet structures appropriate to the particular protocol chosen at the session level to control the conveyance of each encoded layer of data. Preferably, each layer of encoded data may be conveyed over a network using a different respective instance of the Real-time Transport Protocol (RTP) referenced above. The packetiser 120 would, in that case, split the data within a layer of encoded frames 340 across the payload portions of a sequence of RTP packets, according to the RTP packet structure definition. Conveniently, if packetising data encoded using the H.263 algorithm referenced above, a specific definition of an H.263 payload header is available for inclusion in RTP packets, as defined in "RTP Payload Format for H.263 Video Streams", Internet RFC 2190, September 1997, published on the Internet by the IETF. Alternative and equally satisfactory session-level protocols may be selected for implementation by the packetiser 120, employing their own respective packet structures to convey the encoded layers 300–310 of data frames 340.

Referring to FIG. 4, as indicated above, each of the packets 400 is shown labelled with sequence numbers applied by packet numbering module 125. A preferred method of numbering involves the assignment of two sequence numbers to each packet 400. The number shown in the upper half of each packet 400 of FIG. 4 may be referred to as a "layer sequence number" LSEQ, while the number shown in the lower half of each packet may be referred to as a "cross-layer sequence number" XSEQ. The sequence of LSEQ numbers indicates the order of transmission of packets within one specific layer. The XSEQ numbers are intended to represent the correct overall order for presentation of encoded data conveyed by those packets to a decoder 225 at a client apparatus 200. The XSEQ sequence reflects, in particular, the order that encoded data frames emerged from the source 105.

Protocols such as RTP provide a facility to assign sequence numbers to packets within a particular RTP packet stream. In this case, each layer of encoded data may be broadcast as a separate RTP packet stream under the control of different RTP session. Hence, within one layer, the respective (RTP) session handier 130 may automatically assign a layer sequence number LSEQ to each packet before transmission and write the sequence number at a predetermined position with the packet. Other types of protocol may not provide such a facility for assignment of layer sequence numbers. Hence the packet numbering module 125 may implement both layer sequence number assignment and cross-layer sequence number assignment if required.

With different layers being typically broadcast under the control of separate protocol sessions, as with RTP, there is no overall mechanism for assigning XSEQ numbers across layers. In order to assign a sequence of XSEQ numbers in particular, the packet numbering module 125 may be provided at a point immediately following the packetiser 120 and immediately before the individual packet streams go to their respective session handlers 130 for broadcast. If required, the packet numbering module 125 may retain access to information on the order of receipt of encoded data frames at the input 115 in order to correctly assign XSEQ numbers to packets emerging from the packetiser 120. It is particularly important, when encoding data using a differential encoding algorithm such as that defined by H.263, to subsequently decode those data in the correct sequence. Assignment of an XSEQ number by the packet numbering module 125 provides a particularly convenient method of recording the correct data sequence at the packet level. Data loss or reordering of data typically occurs at the packet level. As will be discussed in the following, recording of a layer sequence number LSEQ and, in particular, a cross-layer sequence number XSEQ enables a client apparatus 200, according to preferred embodiments of the present invention, to re-order packets received out of sequence and to take account of missing packets and missing or inaccessible encoded data layers.

Figure 5A:
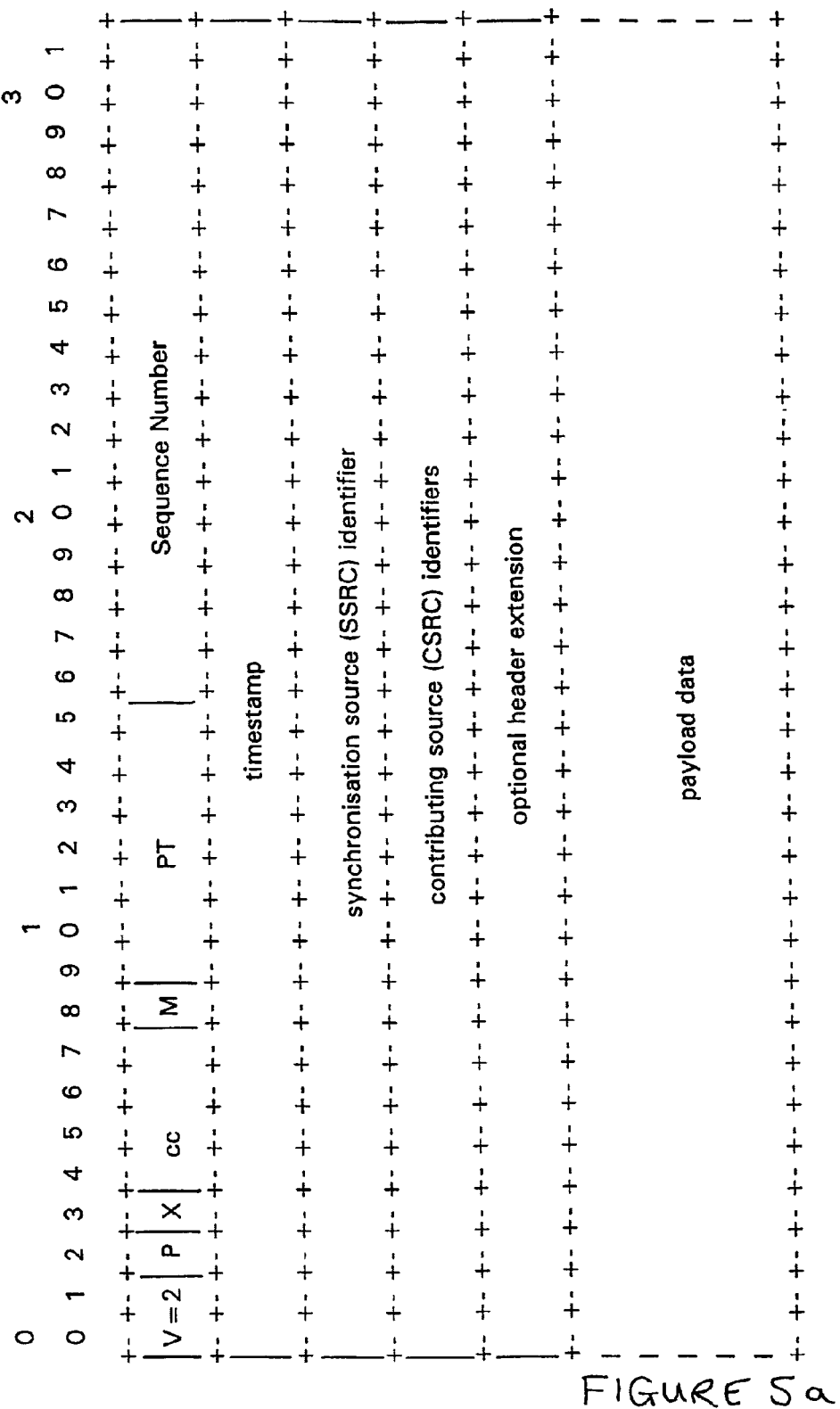
FIG. 5 shows the structure of a packet header according to the Real-time Transport Protocol (RTP) as used in a preferred embodiment of the present invention.

Referring to FIG. 5, the packet header structure defined for use under RTP is shown. The RTP packet structure may be used by preferred embodiments of the present invention to record packet sequence numbers. FIG. 5a shows the RTP header structure, including an optional RTP Header Extension, while FIG. 5b shows the structure of the header extension itself, all details of which are described by the above-referenced RTP definition document. The RTP packet header of FIG. 5a includes a Sequence Number field occupying the third and fourth octets. This field is used within the RTP protocol to record the transmission order of packets within the particular packet stream and may therefore perform the role of the layer sequence number LSEQ.

To accommodate the cross-layer sequence number XSEQ, the packet numbering module 125 may preferably use the optional RTP header extension, shown in FIG. 5a at a position immediately following the "Contributing Source (CSRC) Identifiers". With this intention, the packetiser 120 may set the extension bit "X"—bit 4 of the RTP header—and include one RTP Packet Header extension, having the structure shown in FIG. 5b, within each generated packet. Within each packet, the packetiser 120 may record a unique profile-specific identifier within the "profile" field of the header extension and may set the "length" field to 1, including one 32 bit "header extension" field. Such an extension field length should be adequate for use in recording XSEQ numbers generated within a typical multi-media session. The packet numbering module 125 may then write an appropriate XSEQ number into the extension field of each packet received from the packetiser 120.

While the RTP packet structure includes fields suitable for recording assigned sequence numbers, other protocols and packet structures may not provide predetermined positions within their packets to carry sequence number information. If necessary, one or more further packet data streams may need to be generated by the packetiser 120, to be transmitted approximately in synchronisation with other packet streams, to convey sequence numbering information assigned by the packet numbering module 125 and linked, for example by a packet identifier, to packets carrying encoded data. On receipt of the "sequence number packet stream", a client apparatus may extract and use the sequence numbering information in much the same way as described below.

As discussed above in relation to the identification of a transmitting source by the source demultiplexer 215 of a client apparatus 200, for example where multiple video streamers 100 are transmitting RTP packets over the communications network 110, the "SSRC" field in the RTP header of FIG. 5a may be used by an RTP session handler 130 to record within each RTP packet an identifier for the particular video streamer 100 generating the packet. The source demultiplexer 215 of a client apparatus 200 may then read the SSRC field in received packets to distinguish between packets from one video streamer and another.

Figure 6:
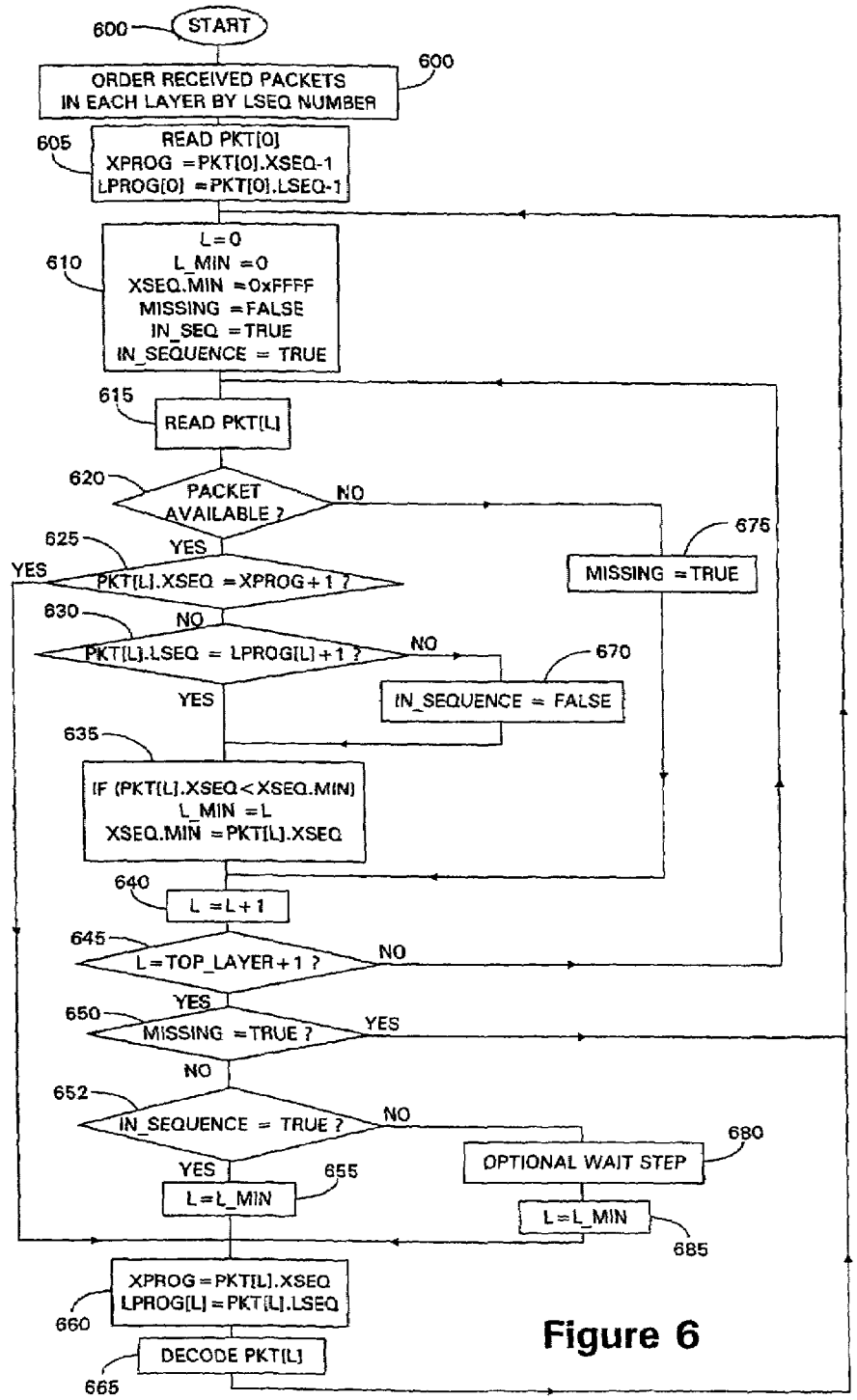
FIG. 6 is a flow diagram showing steps in the operation of a preferred client apparatus, relating in particular to the ordering of packets broadcast by the apparatus of FIG. 1.

Referring to FIG. 6, a flow diagram is provided to show a sequence of steps in operation of an instance of a blender 220 relating to the ordering of packets, received from a particular streamer 100, numbered by a packet numbering module 125, according to preferred embodiments of the present invention. Preferably, a variable "TOP_LAYER" may be set at a predetermined value in a particular client apparatus 200, to record the highest numbered layer that the particular apparatus is set to receive and decode, either by choice or as limited by equipment capability or network connection bandwidth. The TOP_LAYER value may be set within the range 0 to n, where n is the highest numbered layer transmitted by data streaming sources accessible over the network 110.

Referring to FIG. 6, processing by the blender 220 may be seen to begin at STEP 600. At STEP 602, a pre-processing step is performed on packets already respective layer. Ordering of packets by LSEQ number may be implemented by a known and simple ordering algorithm and, as such, further detail of STEP 602 will not be discussed in this specification.

At STEP 605, the blender 220 reads the first received packet on layer O (PKT[O] and uses the layer sequence number (LSEQ) and cross-layer sequence number (XSEQ) contained in that packet to initialise counters LPROG[ ] and XPROG respectively for use in determining the next expected number in each of the packet numbering sequences. At STEP 610, variables are initialised ready for processing packets from the currently selected layer, layer O initially. At STEP 615, an attempt is made to read the packet having the lowest layer sequence number (LSEQ) from the layer (L) currently being processed (initially layer L=O). Packets already received in time for operation of STEP 602 will have been ordered by layer sequence number so that, among those already received, the next packet read from the layer L may be assumed to have the lowest LSEQ number. If, at STEP 620, a packet is available in layer L, then, at STEP 625, the cross-layer sequence number (XSEQ) in that packet is compared with the next expected cross-layer sequence number. If, at STEP 625, the current packet is the next in the cross-layer sequence then, at STEP 660, the current packet sequence numbers are used to set the XPROG and LPROG[L] counter variables before, at STEP 665, that packet is forwarded to the decoder 225.

If, at STEP 620, no packet is available on the current layer, then at STEP 675 a flag is set to indicate that packets are unavailable on a layer and processing proceeds to STEP 640 to enable higher layers to be accessed in search of packets.

If, at STEP 625, the current packet is not the next in the cross-layer sequence, then either the next expected packet is missing from within the current layer or it lies in another layer. A following sequence of steps attempts to establish whether the next expected packet for decoding is currently missing—possibly delayed—within the current layer, or whether it may be found in another accessible layer. Therefore, at STEP 630, the blender 220 first checks whether the current packet is the next expected packet within the current layer (L). If not, then at STEP 670 a flag is set to indicate that the current packet is out of sequence in its layer before processing continues to STEP 635. If, at STEP 630, the current packet was the next expected packet in its layer, then the packet having the next expected XSEQ number must lie in another layer. However, in case the packet is soon found not to lie in a layer accessible by the client apparatus 200, or to be otherwise lost (from STEP 670), then at STEP 635 a variable recording the smallest recently encountered XSEQ number is updated along with the layer in which that respective packet was found. This will be the point of continuation in processing if the packet with the next expected XSEQ number it not located in any of the accessible layers. But first, any other accessible layers are checked.

The layer number is incremented at STEP 640. If the new current layer is at or below the highest layer accessible to the client apparatus at STEP 645, then processing returns to STEP 615 and the next expected packet is sought within that layer as described above. However, if at STEP 645, the new current layer is inaccessible then, at STEP 650, a check is made to determine whether packets are currently unavailable on any layer. If, at STEP 650, one or more layers have no received packets available, then processing restarts at STEP 610, looking again for the next expected packet, beginning at layer O. If, at STEP 650, all layers have at least one packet available, then at STEP 652 it is determined whether or not the current packet is the next expected packet within its layer. If, at STEP 652 the current packet is correctly ordered within its layer, then the next expected packet in the XSEQ order must lie in a higher layer, one that is not accessible to the particular client apparatus 200. Therefore, the best that can be achieved is to select the packet with lowest XSEQ number on any layer. Therefore, at STEP 655, the layer having the packet with the lowest XSEQ number is selected as the new current layer, and that selected packet is treated as the next available packet for decoding. The XPROG and LPROG[L] sequence number counters are reset to the current packet values at STEP 660 and the selected packet is sent for decoding at STEP 665.

If, at STEP 652, the current packet was out of sequence within its layer, then at STEP 680, the blender 220 may optionally elect to wait for the next one or two packets to arrive on that layer for example, in case the next expected packet within the layer arrives (in which case processing would restart at STEP 610) or to continue without further delay to STEP 685 and select the layer having the packet with the lowest XSEQ number as the new current layer, and select that packet as the next available packet for decoding, proceeding to STEP 660.

After sending a packet for decoding at STEP 665, processing returns to step 610, resetting variables related to out-of-sequence processing and resetting the layer number L to O, before continuing as described above.

It will be clear that more sophisticated processing steps may be included to implement different strategies in the event that, at STEP 652, received packets within a layer are out of sequence within that layer. If the nature of the communications network 110, or the protocols selected to transfer packets across it, are such that individual packets may be delayed within a layer, then it may be beneficial to implement more sophisticated waiting algorithms if there is a possibility that the expected packet may arrive later. Such a strategy is suggested in STEP 680 of FIG. 6 without going into detail. Alternatively, with pure audio data for example, the effect of a lost packet may be partially overcome by inserting a duplicate of the immediately preceding packet, rather than leave a gap or risk further delay. An equivalent strategy may be available with encoded video data, if manageable under the selected encoding/decoding algorithm.

Preferably, a more sophisticated algorithm may be implemented to merge the ordering of received data packets within a layer with processing steps indicated within FIG. 6 from STEP 605 onwards, rather than perform pre-processing to order received data packets by LSEQ number within each layer.

What is claimed is:

1. A data streaming apparatus comprising:
    a data input for receiving data frames encoded by a layered encoding algorithm;
    packetizing means for inserting received data frames, so encoded, into one or more predetermined packet structures, the data frames associated with each encoded layer being inserted into a different respective sequence of packets;
    packet numbering means for assigning a data sequence number to each packet generated by the packetizing means, the data sequence numbers assigned to the packets running in a single sequence indicative of the order of receipt, at the data input, of encoded data inserted within the packet; and a network interface for transmitting packets so created and for transmitting the assigned data sequence numbers.

2. A data streaming apparatus as in claim 1, wherein the packetizing means is arranged to generate one or more further sequence of packets for use in conveying data sequence numbers assigned by the packet numbering means.

3. A data streaming apparatus as in claim 1 in which the packet numbering means is arranged to write each said data sequence number at a predetermined position within its packet.

4. A data streaming apparatus comprising:
a data input for receiving data frames encoded by a layered encoding algorithm;
packetizing means for inserting received data frames so encoded, into one or more predetermined packet structures, the data frames associated with each encoded layer being inserted into a different respective sequence of packets;
packet numbering means for assigning a data sequence number to each packet generated by the packetizing means, the data sequence numbers assigned to the packets being indicative of the order of receipt, at the data input, of encoded data inserted within the packet;
wherein the packet number means is arranged to assign a further sequence numbering to each packet generated by the packetizing means said further sequence numbers assigned to a respective sequence of packets being indicative of the position of the packet within that sequence of packets, and
a network interface for transmitting packets so created and for transmitting the assigned data sequence numbers.

5. A data streaming apparatus as in claim 4 in which the packet numbering means is arranged to write each said data sequence number at a predetermined position within its packet.

6. A data streaming apparatus according to claim 4, wherein the packetizing means is arranged to generate one or more further sequences of packets for use in conveying data sequence number assigned by the packet numbering means.

7. A method for transmitting data frames encoded by a layered encoding algorithm over a communications network, said method comprising:
(1) receiving encoded data frames;
(2) inserting data from said data frames into data packets generated according to a predetermined packet structure, data from each layer of encoded data frames being inserted into a separate sequence of data packets;
(3) assigning to each data packet a data sequence number, said sequence numbers running in a single sequence indicative of the required order; for subsequent presentation of the frames to a decoder;
(4) transmitting said packets and transmitting said data sequence numbers along with said packets.

8. A method as in claim 7, further including:
receiving said data packets of at least two of said one or more separately accessible sequences of data packets and reordering the data packets in order of assigned data sequence number.

9. A method as in claim 7 in which the layered coding algorithm is a video encoding algorithm which outputs video frames not in the order in which they were sampled but in the order in which they are to be decoded.

10. A method as in claim 7 including writing each said data sequence number at a predetermined position within its packet.

11. A method as in claim 7 including generating one or more further sequences of packets for use in conveying said data sequence numbers.

12. A method for transmitting data frames encoded by a layered encoding algorithm over a communications network, said method comprising:
(1) receiving encoded data frames;
(2) inserting data from said data frames into data packets generated according to a predetermined packet structure, data from each layer of encoded data frames being inserted into a separate sequence of data packets;
(3) assigning to each data packet a data sequence number, said sequence numbers being indicative of the required order for subsequent presentation of the frames to a decoder;
(4) assigning a further sequence number to each packet a said further sequence numbers assigned to a respective sequence of packets being indicative of the order of transmission of data packets within that sequence of packets; and
(5) transmitting said packets and transmitting said data sequence numbers and said further sequence numbers along with said data packets.

13. A method as in claim 12, further comprising:
receiving said data packets at least two of said one or more separately accessible sequences of data packets, and reordering the data packets in order of assigned data sequence number.

14. A method as in claim 12 in which the layered encoding algorithm is a video encoding algorithm which outputs video frames not in the order in which they were sampled but in the order in which they are to be decoded.

15. A method as in claim 12 including writing each said data sequence number at a predetermined position within its packet.

16. A method as in claim 12 including generating one or more further sequences of packets for use in conveying said data sequence numbers.

17. A method of ordering data packets received within plurality of separately accessible sequences of data packets received over a communications network, each sequence of data packets conveying data frames relating to a different layer of encoded data frames output by a layered encoding algorithm, each data packet having assigned thereto a data sequence number indicative of the order of output of encoded data, conveyed by said data packet, from said encoding algorithm, and a further sequence number indicative of the position of said data packet within the respective sequence of data packets, the method comprising:
selecting data packets in order of further sequence number within a first of said accessible sequences of data packets:
outputting selected packets from said first sequence in order of assigned data sequence number, and,
upon selecting a packet from said first sequence having an out-of-sequence data sequence number, searching another of said separately accessible sequences for the next expected packet, according to data sequence number.

* * * * *